United States Patent [19]

McIntosh

[11] Patent Number: 4,810,043
[45] Date of Patent: Mar. 7, 1989

[54] TIRE-LOCATED TRACK

[75] Inventor: Lawrie G. McIntosh, Etobicoke, Canada

[73] Assignee: Ontario Drive and Gear Limited, New Hamburg, Canada

[21] Appl. No.: 23,958

[22] Filed: Mar. 11, 1987

Related U.S. Application Data

[63] Continuation of Ser. No. 733,034, May 13, 1985, abandoned.

[30] Foreign Application Priority Data

Aug. 29, 1984 [CA] Canada .................................. 462078

[51] Int. Cl.[4] ........................ B62D 55/07; B60B 19/02
[52] U.S. Cl. ........................................ 305/15; 305/39; 305/19
[58] Field of Search ........................ 305/34, 39, 45, 53, 305/54, 56, 15, 46, 13, 19; 301/48, 51; 152/226-230

[56] References Cited

U.S. PATENT DOCUMENTS

| | | | |
|---|---|---|---|
| 1,631,114 | 6/1927 | Anderson | 305/46 |
| 2,455,307 | 9/1945 | Irvin. | |
| 2,976,903 | 3/1961 | Verdesca | 152/228 |
| 3,497,271 | 2/1970 | Keller | 305/13 |
| 4,089,565 | 5/1978 | Loegering | 305/45 X |
| 4,099,794 | 7/1978 | Hoffart | 305/13 |
| 4,154,488 | 5/1979 | Svensson et al. | 301/48 X |
| 4,408,646 | 10/1983 | Forsyth et al. | 305/19 |
| 4,425,007 | 1/1984 | Soeteber | 305/11 |

FOREIGN PATENT DOCUMENTS

| | | | |
|---|---|---|---|
| 900535 | 11/1953 | Fed. Rep. of Germany. | |
| 964661 | 5/1957 | Fed. Rep. of Germany. | |
| 744146 | 4/1933 | France. | |
| 13302 | of 1908 | United Kingdom | 152/230 |
| 324135 | 1/1930 | United Kingdom. | |
| 350797 | 6/1931 | United Kingdom | 305/56 |

Primary Examiner—Robert B. Reeves
Assistant Examiner—Russell D. Stormer
Attorney, Agent, or Firm—Anthony Asquith

[57] ABSTRACT

An add-on track system for an all-terrain vehicle is disclosed. ATV tires are very soft and flexible, and apt to climb out of a track if the track is not properly located. The invention has a track segment with arms protruding up from the slope-plate of the segment, and the arms converge inwards. The upper ends of the arms locate the segment against the tire side walls, but at a level on the sidewalls where the tire profile is free of the bulging under load which is so marked in ATV tires. The segments have holes through the sole-plate, through which the overhanging parts of the converging arms can be moulded, without movable cores. Retractable cleats occupy these holes, and are forced out when the tire bulges under load.

14 Claims, 3 Drawing Sheets

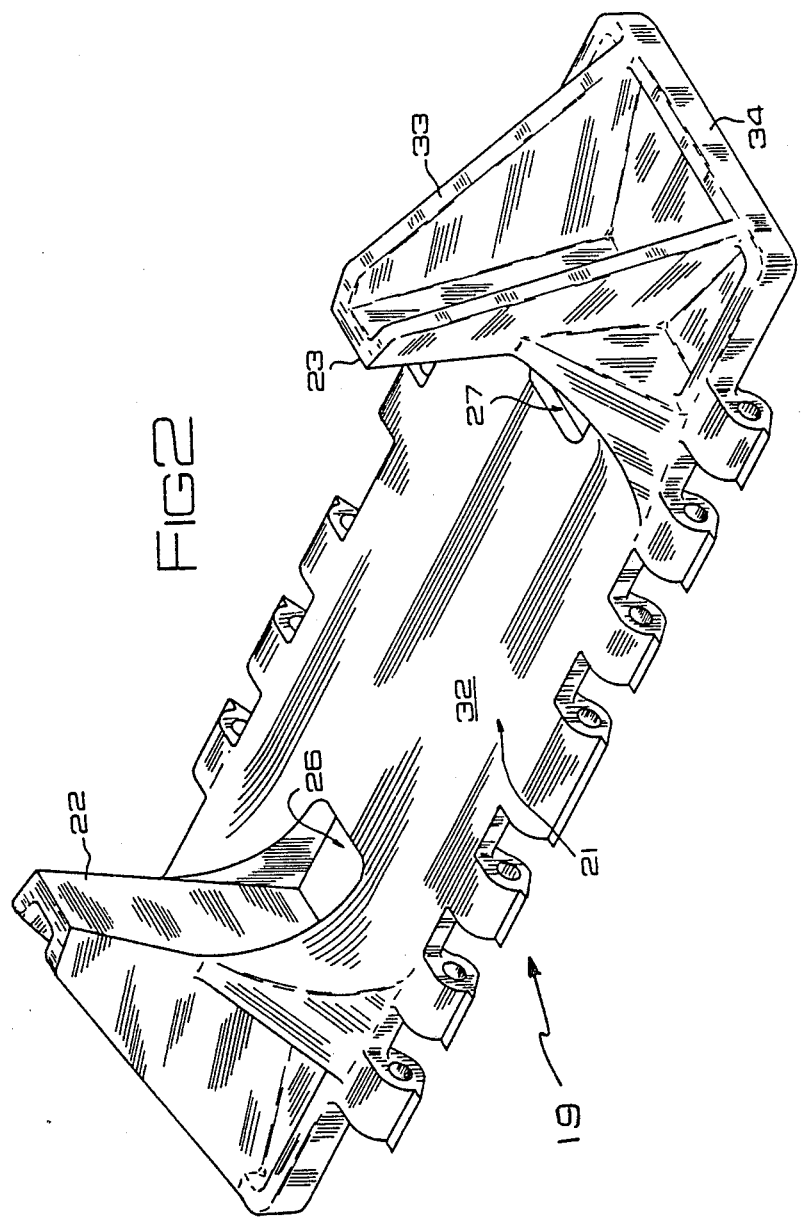

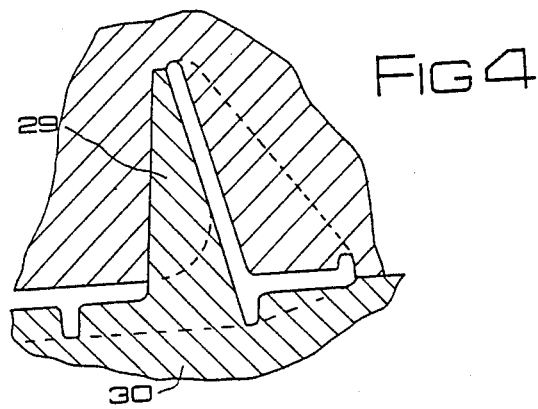
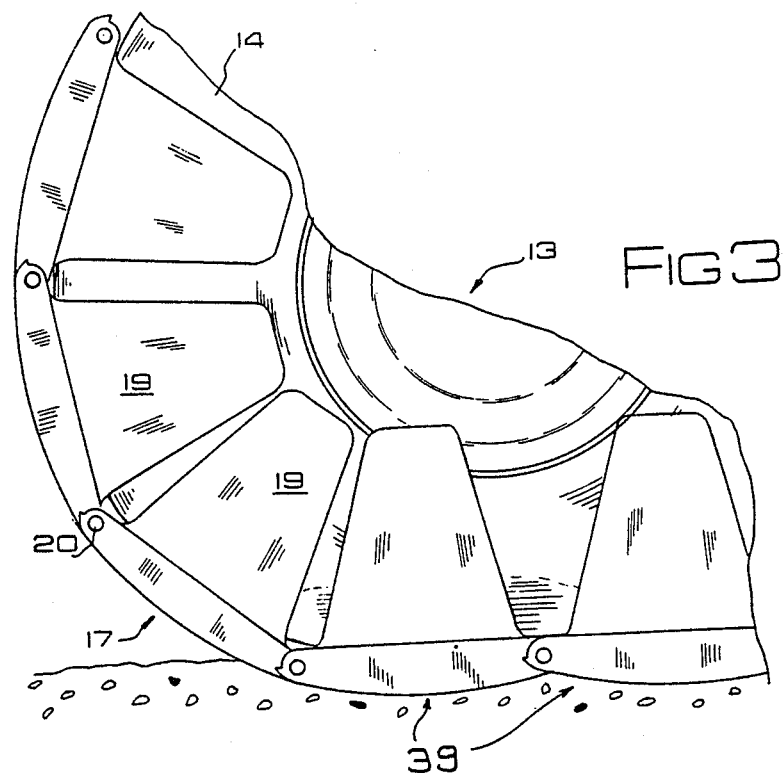

TIRE-LOCATED TRACK

This application is a continuation of Ser. No. 733,034, filed May 13, 1985 and now abandoned.

This invention relates to add-on tracks for vehicles with very-low-pressure tires, particularly all-terrain vehicles.

BACKGROUND OF THE INVENTION

An ATV typically includes three or four wheels disposed one behind the other along each side of the vehicle, the axles of which usually are all constrained to move in unison by means of gears and chains. The vehicle is skid-steered.

Typically, an ATV has no suspension in the normal sense. The tires are extremely elastic and provide all the suspension resilience that is needed.

The tires are set to a very low pressure, typically in the region of one sixth of atmospheric pressure. Such tires are very flexible, and the bulge of the tire, where the weight of the ATV rests on it, is very marked. The difference in width between a bulged and an unbulged tire profile can be around 4 cm.

An ATV has an extremely powerful drive capability over most off-road surfaces. Even so, the ATV user sometimes finds it desirable to fit tracks over the wheels to improve the traction when travelling over such surfaces, for example, as wet snow upon hard ice, or just-thawing mud.

Optional add-on tracks are therefore offered by ATV manufacturers for fitting over the tires.

If such a track is allowed to wander sideways with respect to the tires, then it soon happens that the very flexible tires start to climb over the segments of the track, and the track is shed. Experience has shown that if the track has a permitted slack on the wheel of more than a millimetre or two, measured laterally of the track, the track will not stay on.

It has been proposed to locate the segments from the sides of the laden, bulged profile of the tires. The segment is inevitably therefore well clear of the unbulged profile. This is not satisfactory.

In this case, the track being in contact with half the circumference each of the front and back wheels of the ATV, the track is not located laterally until it is right under these wheels.

Those parts of the track not actually under the wheels are in engagement with the unbulged, unloaded profile of the wheel, and are not adequately located laterally. The result is that the tires climb out of the tracks.

To cure the track-shedding problem, manufacturers have found it necessary hitherto to locate the tires from the unbulged profile. This is effective to retain the track on the ATV, but it carries the great disadvantage that the bulge of the tire now has to squeeze through the segments of the track, since the track is adapted to engage the unbulged profile of the tire.

So much engine-power is required to squeeze the tires through the segments that the top-speed of the ATV is reduced, typically, by as much as 50%. And also, the constant manipulation of the loaded part of the tire can lead to early tire failure.

PRIOR ART

Add-on tracks for fitting over the tires of vehicles are shown in U.S. Pats. Nos. 4,099,794 (Hoffart, July 11, 1978) and 4,089,565 (Loegering, May 16, 1978). In both these proposals, the tires are of the almost-rigid kind that hardly bulge at all at the bottom. Hence, Hoffart and Loegering have no problem in locating the track from the side-profile of the tires, because the side-profile remains substantially constant.

In U.S. Pat. No. 2,455,307, (Irvin, Sept. 11, 1945) the problems of side-profile location are recognized, and illustrated in FIGS. 16 and 17. Irvin teaches that the track should be clear of the bulged profile of the tire: but he also teaches that the track can at the same time be located laterally by means of the unbulged profile, by providing sloping ribs (Irvin's ref. numeral 33) that engage between the knobs of tread on the tire. Thus there is a mechanical cog-wheel kind of engagement between the tire and the track, if Irvin's proposal is taken. This leads to the following problem.

When a tire undergoes a marked change in radius, the track and the tire are only matched for speed at the very bottom of the tire. At this point, both of course are at zero velocity. It is clear that the top of the track is moving forwards at exactly twice the speed of the vehicle. But the top of the tire is moving forwards at a faster speed than twice the vehicle speed. This is because the tire radius is smaller at the bottom of the wheel than at the top. The very flexible tires of ATVs can undergo a change in radius of as much as 6 cm between loaded and unloaded, which may be radius change of about 25%. There is a corresponding percentage difference in relative speed between the unbulged parts of the tire and the track.

If there were to be a cog-wheel or meshing kind of engagement between the tire-tread and the track, as Irvin suggests, then the track and the tire could not in that case move at different speeds. The more flexible the tire, the greater the radius change, and the greater the nominal difference in speed between the tire-tread and the track.

Irvin teaches that the problem of the tire tread overtaking the track can be avoided by providing that the connections between the track segments be pivoted at a level above the ground equal to the change in tire radius. But that involves Irvin in the very complicated structure that he shows, with the articulating links between the segments.

The prior art therefore cannot be regarded as teaching any simple effective manner by which an add-on track may be laterally located on an ATV. The penalty may be either a huge extra friction, or on the other hand much greater complication and expense.

The invention is aimed at providing a very simple, yet effective, add-on track.

BRIEF DESCRIPTION OF THE INVENTION

In the invention, the track segments have side-location arms that are spaced widely enough apart that the bulged profile of the tire can be accommodated. The arms however converge, so that the upper ends of the arms engage against the side walls of the tire, but they engage the side walls at a sufficient height above the ground that the side walls at that height are substantially not bulged.

The converging, or re-entrant, side-location arms of the invention therefore laterally locate the track from the sides of the tires, wherever the wheel is in contact with the track, and whether the tire is bulged or unbulged at that point of contact.

The track segment may be designed to be simple enough to be made as a one-piece plastic moulding, if a hole is left through the sole-plate part of the segment. The hole is so positioned that the overhanging portions of the arms as they converge ae visible through the hole or holes. When this condition is met, the segment with its convergent arms can be moulded without the need for expensive moveable cores in the mould.

It is a common feature of add-on tracks that the lateral width of the tracks is somewhat wider than the lateral width of the tire. This gives the track a greater flotation width with respect to the ground, to resist sinking-in. The extra width means that the side-location arms are attached to the sole-plate some way in from the lateral extremities of the sole-plate. Thus there is ample room for heavy buttress ribs to brace the converging arms of the invention and make them rigid with respect to the sole-plate.

Another aspect of the use of tracks for ATVs is the provision of cleats, for even more traction. The cleats are provided for driving on ice and snow, where the cleats dig into, and hence grip, the relatively hard ice.

The cleats need to be quite long to be effective. They should protrude beneath the slope-plate of the segment at least 1 cm or so.

If the cleats remain permanently protruding then the cleats run too near the bodywork of the ATV over the top of the tires. Therefore, the designer tries to arrange that the cleats are retracted whenever they are not actually being pressed into the ground.

U.S. Pat. Nos. 1,399,413 (Stone, 1921); 1,453,686 (Look, 1922); 1,631,114 (Anderson, 1924); and 4,154,488 (Svensson, 1979) all illustrate the complexity hitherto required if retractable cleats are to be provided. In the present invention, retractable cleats can be provided very simply and inexpensively. Not only that, but the designer can provide the cleats yet add virtually nothing to the working thickness of the sole-plate.

In the invention, the cleats when retracted occupy the space between the side-location arms and the sole-plate. In fact, it is the action of the tire in bulging to fill that space that is effective to move a cleat from its retracted to its operative position.

FIG. 2 is a pictorial view of a segment of a track that embodies the invention.

FIG. 3 is a side elevation of the wheel of FIG. 1.

FIG. 4 is a section of part of a mould for making the segment.

Figure 1:
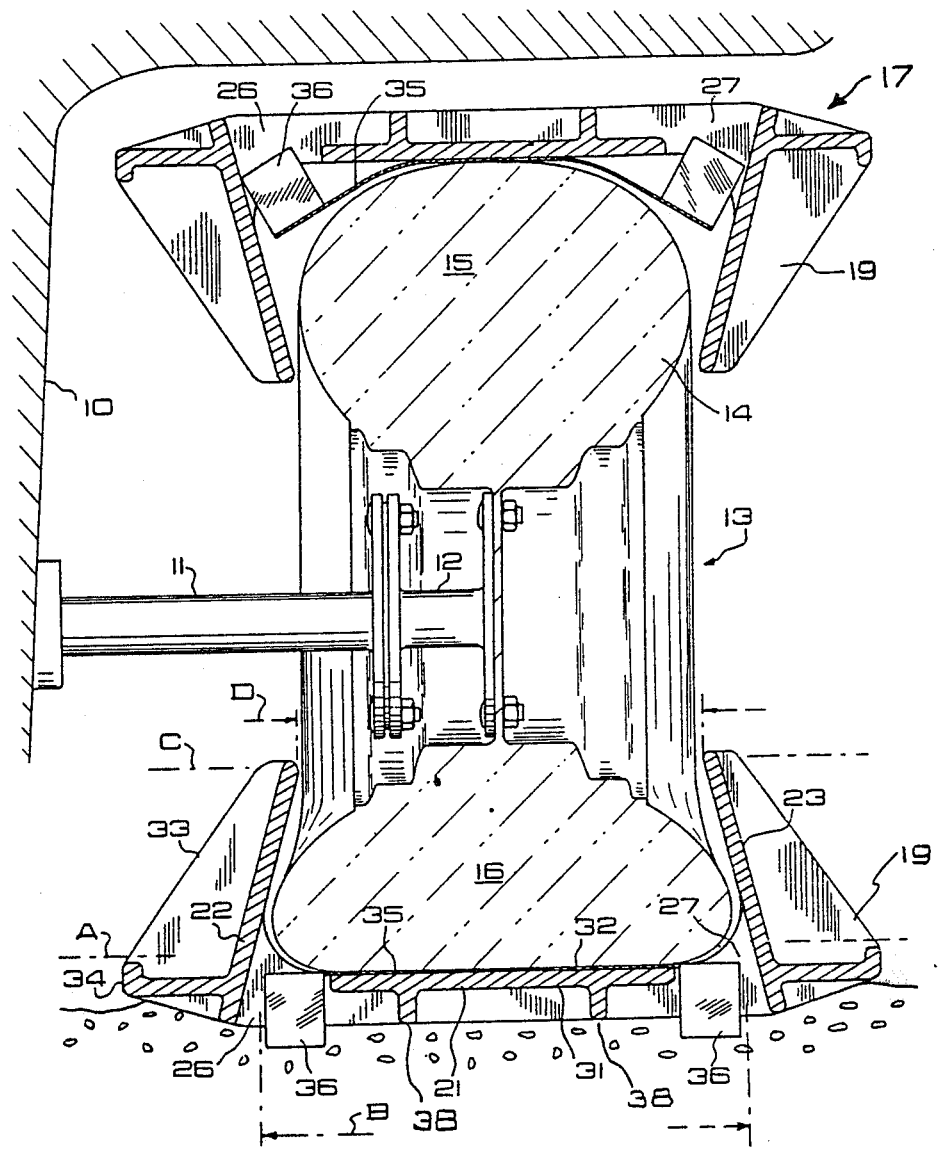
FIG. 1 is a section through a road wheel and tire of a vehicle to which the track has been fitted.

FIG. 1 shows part of the body work 10 of an allterrain vehicle. The ATV has an axle-shaft 11, to which is attached a shaft extension 12. Add-on tracks for an ATV are generally substantially wider than the lateral width of the tire, and the extension 12 is provided to give the track ample space in-board of the wheel.

A wheel 13 is attached to the extension 12, and a very-low-pressure tire 14 is attached to the wheel 13.

The top of the tire 14 has an unbulged profile 15, whereas the bottom of the tire has a bulged profile 16.

An add-on track 17 is fitted over the tire 14. The track 17 comprises many segments 19, which are held together by linking pins 20. The segments 19 are all identical one-piece moulding.

A segment 19 comprises a flat sole-plate 21, and two side-location arms 22,23. At the level A which is near the level of the sole-plate 21, the arms are spaced apart a distance B, which is great enough that the maximum bulged profile 16 of the tire can be accommodated between the inner profiles of the arms 22,23, substantially without touching the arms.

The arms 22,23 converge. At a level C, the arms are a distance D apart. The level C is far enough above the sole-plate 21 that the tire walls 24,25 substantially do not change their relative distance apart when the bottom of the tire is bulging.

Holes 26,27 are provided which pass right through the sole-plate 21. The arms 22,23 are visible through these holes, when viewed from beneath the sole-plate. As may be seen in FIG. 4, this condition ensures that the converging arms 22,23 may be moulded without having to resort to moveable cores. A spigot 29 protrudes from a lower die 30, against which the overhanging features of the arm may be moulded.

The undersurface 31 of the sole-plate 21 is heavily ribbed, the ribs running both laterally and longitudinally, i.e. in the direction in which the tires roll over the sole-plate. Not only do the ribs stiffen the sole-plate, but they dig into soft ground and provide some mechanical interaction for greater traction.

The upper surface 32 of the sole-plate 21 however is flat and smooth. There is no mechanical interaction or meshing of the track segments with the tire tread, for the reasons previously mentioned.

It should also be noted that the longitudinal ribs, such as those indicated at 38, as well as the lower extremities of arms 22,23, may have an outwardly directed concavity, particularly as indicated at 39 in FIG. 3. The reason for that concavity is that, when the vehicle is being driven over a hard surface such as pavement—so as to cross a highway, for example—the curve of the longitudinal ribs 38 accommodates a rolling contact where the segments 19 meet the hard surface. This provides a much smoother ride, and also a much quieter ride. Of course, the longitudinal ribs also resist side slip when the vehicle is being driven over a soft surface, particularly if it is tilted sideways so that one side of the vehicle and one track is below the other.

The arms 22,23 are braced by means of buttress ribs 33. The sole-plate 21 is substantially wider than the distance B, so there is ample room between the extremities 34 of the sole-plate and the arms for the ribs 33 to provide firm support for the arms.

The track 17 constructed in the above manner is very effective, and not at all prone to shedding. Yet the segments 19 are inexpensive to make, and simple to fit: the only components required in the track are the segments themselves and the pins 20 that link them together.

A leaf spring 35 is mounted to the sole-plate 21. Cleats 36 are fitted at the ends of the spring 35. The spring holds the cleats 36 normally in the retracted position shown in the upper part of FIG. 1, where the cleats occupy the holes 26,27 and protrude from those holes some little distance above the sole-plate (i.e. on the tire side of the sole-plate). Thus the cleats are well clear of the bodywork 10.

When the tire is taking its bulged profile 16, the profile of the tire fills the space that the cleats and spring 35 were occupying, and the cleat is forced downwards to its operative position shown in the lower part of FIG. 1, in which the cleat protrudes below the sole-plate, i.e., into the ground.

The leaf spring 35 acts to locate and guide the cleats for movement, yet the spring adds virtually nothing to the thickness of the sole-plate 21.

A suitable material from which each of the track segments 19 may be injection moulded is a plastic such as polypropylene or polyethylene, copolymers of polypropylene and polyethylene, mixtures or copolymers of those plastics with rubber, as well as other tough and wear-resistant injection-mouldable materials. For purposes of increased flowtation of the tracked vehicle, and also for purposes of ensuring no loss of the track, it may have a specific gravity of less than 1.0; most of the plastic materials have a slightly lower specific gravity. Moreover, the injection moulded elements may be formed of a skinned foam material, either closed cell or open cell.

I claim:

1. Segmented track for a vehicle,
   where the track is suitable for fitting over the tires of the vehicle,
   where the tires are of the kind that bulge under load to a marked degree;
   where a segments of the track has a sole-plate and respective upstanding side-location arms, one towards each respective lateral end of the sole-plate;
   where the two side-location arms are convergent, from a first distance apart of the arms, measured near the level of the soleplate, the said first distance being wide enough that the profile of each arm is substantially clear of the maximum bulged profile of the tire, to a second distance apart of the arms, measured at a remote level that is spaced from the sole-plate, the second distance being narrow enough that the arms at that level are so close to the opposing tire side walls that the segment is thereby located laterally from the side walls;
   where one of the segments has mounted on it a cleat assembly, comprising a cleat, a guiding means, and a spring;
   where the overall height of the cleat, measured perpendicularly to the plane of the sole-plate, is greater than the thickness of the sole-plate;
   where the guiding means constrains the cleat for movement from an operative position, in which the cleat protrudes below the soleplate, to a retracted position, in which the cleat protrudes above the sole-plate;
   and where the spring urges the cleat to the retracted position.

2. Track of claim 1, where the cleat in the retracted position at least partially occupies space allowed in the profile of the segment for the tire to bulge into.

3. Track of claim 2, where the action of a tire in bulging under load into the said space is effective to move the cleat, against the resilience, from the retracted position to the operative position.

4. Track of claim 3, where the cleat occupies a hole through the segment.

5. Track of claim 4, where the said remote level is a level towards the centre of the wheel where the tire width substantially does not change even when the tire is bulging to its maximum extent;
   where a segment of the track is a unitary integral moulded part;
   where the sole-plate is substantially wider than the said first distance apart of the arms;
   where an arm is braced by means of at least one buttress rib extending between the arm and the lateral extremity of the sole-plate;
   where, as a result of the said convergence, a portion of an arm overhangs the sole-plate; and where the sole-plate has a hole completely through it of such size and location that all of the said overhanging portion is visible through the hole when viewed perpendicularly to the plane of the sole-plate;
   and where the hole that the cleat occupies is the said hole completely through the sole-plate.

6. Track of claim 5, where the segment has two cleats, each occupying a respective such hole, the cleats being mounted on a leaf spring that is fixed to the segment so arranged that, when a tire rolls over the sole-plate, the spring lies flat between the upper surface of the sole-plate and the tire.

7. Tracked vehicle, characterized:
   in that the vehicle includes two or more wheels arranged in tandem along one side of the vehicle;
   in that the vehicle includes a track on the said side of the vehicle, and the track passes from wheel to wheel;
   in that the wheels include tires, and the tires are of the very resilient kind where the profile of a radially-outer portion of at least one of the (wheels) tires bulges laterally to a marked degree when the wheel is under load, and where the profile of a radially-inner portion of the (wheel) tire remains substantially unchanged when the said outer portion is bulged;
   in that the track is in segments, and each segment includes a sole-plate and a pair of upstanding side-location arms;
   in that the side-location arms are positioned one towards each of the two lateral ends of the sole-plate, leaving an open space between the two location arms;
   in that (the tip portions of) the two side-location arms include each a respective tip-portion, being (ie) the portions of the arms that are remote from the sole-plate, wherein the tip portions are in close-spaced guiding and locating adjacency to the radially inner portions of the (wheels) tires;
   and in that (the root portions of) the two side-location arms include each a respective root-portion, being (ie) the portions of the arms adjacent to the sole-plate, wherein the root-portions are wide enough apart to allow the radially-outer portions of the (wheels) tires, when bulged laterally, to pass between the arms, substantially without interference wherein the tip portions are close enough together that the distance apart of the tip portions is smaller than the lateral width of the said radially outer portions of the tires, when bulged laterally 8. Track, which is suitable for use on a vehicle of the kind:
   which includes two or more wheels arranged in tandem along one side of the vehicle;
   and in which the wheels include tires, and the tires are of the very resilient kind where the profile of a radially outer portion of the tire (wheel) bulges laterally to a marked degree when the wheel is under load, and where the profile of a radially inner portion of the tire (wheel) remains substantially unchanged when the said outer portion is bulged;
   characterized in that the track, in use of the track on the said vehicle, passes from wheel to wheel along the side of the vehicle;
   in that the track is in segments, and each segment includes a sole-plate and a pair of upstanding side-location arms;

in that the side-location arms are positioned one towards each of the two lateral ends of the respective sole-plate, leaving an open space between the two location-arms;

in that the (tip portions of the) two side-location arms include each a respective tip portion, being (ie) the portions of the arms that are remote from the sole-plate, wherein the tip portions are of such distance apart that, in use of the track on the said vehicle, the tip portions lie in close-spaced guiding and locating adjacency to the profile of the said radially iner portion of the tire (wheel);

in that the (root portions of the) side-location arms include each a respective root portion, being (ie) the portions of the arms adjacent to the sole-plate, wherein the root portions are substantially further apart than the the said tip-portions;

and in that the root portions are wide enough apart that, in use of the track on the said vehicle, the radially-outer portion of the tire (wheel), when bulged laterally, can pass between the arms, substantially without interference wherein the tip portions are close enough together that the distance apart of the tip portions is smaller than the lateral width of the said radially outer portions of the tires, when bulged laterally 9. Track of claim 8, further characterized:
in that the two side-location arms both slope inwards, and converge towards each other.

10. Track of claim 9, further characterized:
in that each segment of the track is a unitary integral moulded part.

11. Track of claim 10, further characterized:
in that the upper surface of the sole-plate is flat and smooth.

12. Track of claim 10, further characterized:
in that the sole-plate is substantially wider than the said first distance apart of the arms;
and in that the arms are braced by means of respective buttress ribs extending between the arms and the respective lateral extremities of the sole-plate.

13. Track of claim 10, further characterized:
in that, as a result of the said convergence, a portion of at least one of the arms overhangs the sole-plate;
and in that the sole-plate has a hole completely through its thickness of such size and location that all of the said overhanging portion is visible through the hole when viewed perpendicularly to the plane of the sole-plate.

14. Track of claim 13, further characterized:
in that the said holes are suitable to accommodate moulding spigots for moulding the said overhanging portions during the manufacture of the segment.

* * * * *